UNITED STATES PATENT OFFICE.

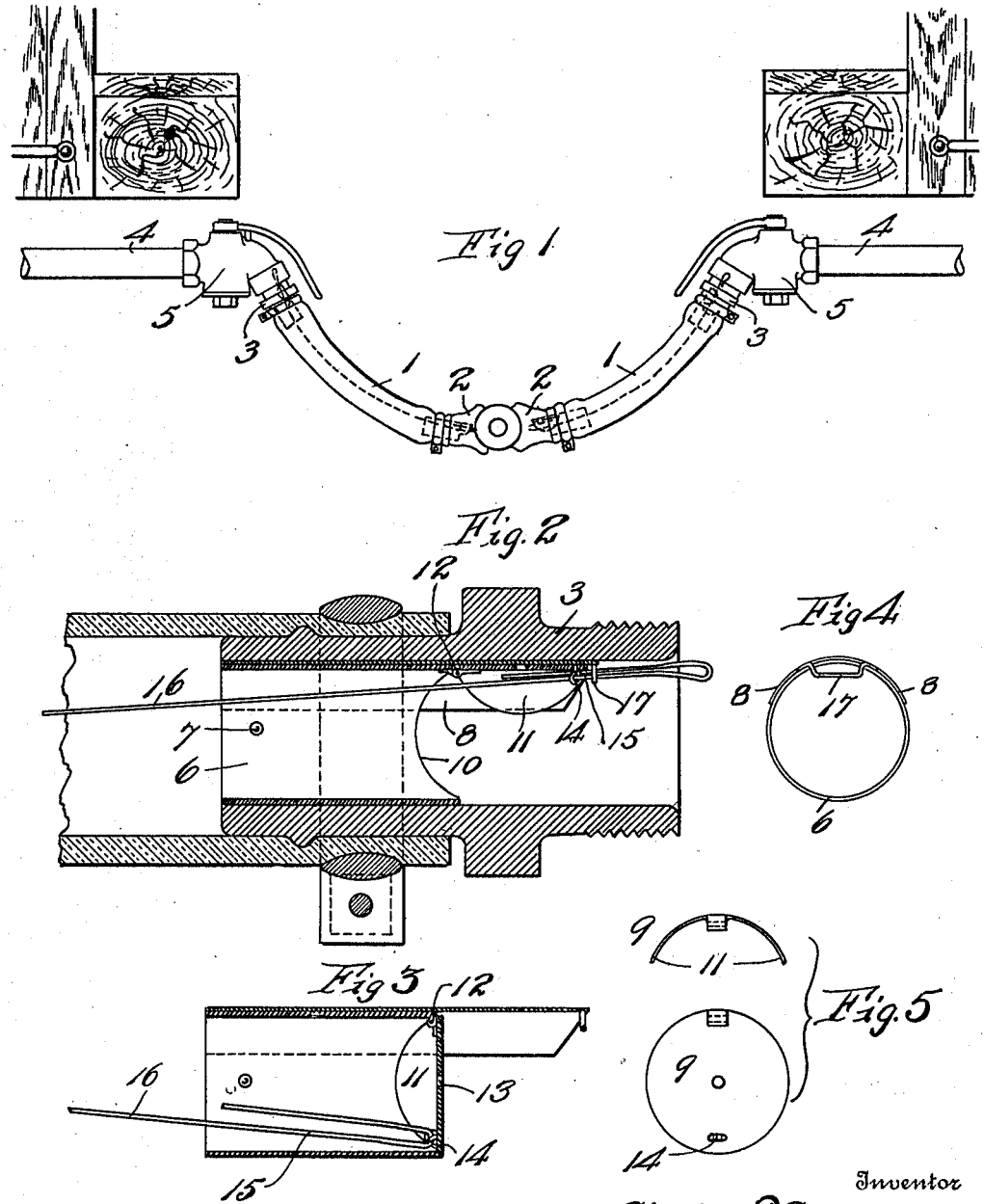

CHARLES F. STRAWMEYER, OF ALTOONA, PENNSYLVANIA, ASSIGNOR OF ONE-FOURTH TO CHARLES ROSS, OF ALTOONA, PENNSYLVANIA.

SAFETY DEVICE FOR AIR-BRAKE HOSE.

993,122. Specification of Letters Patent. Patented May 23, 1911.

Application filed March 31, 1910. Serial No. 552,657.

*To all whom it may concern:*

Be it known that I, CHARLES F. STRAWMEYER, a citizen of the United States, residing at Altoona, in the county of Blair and State of Pennsylvania, have invented certain new and useful Improvements in Safety Devices for Air-Brake Hose, of which the following is a specification.

This invention relates to air-brake systems, and more particularly to a safety appliance in the form of an automatic valve attachment for the brake hose and their coupling members to prevent the sudden application of the brakes in the event of a broken brake hose from any cause, thereby eliminating the disastrous result of the rear cars piling up on the cars in front thereof.

With these and other objects in view, which will be readily apparent to those familiar with the art as the details of the invention are better understood, the same consists in the novel construction, combination and arrangement of parts hereinafter more fully described, illustrated and claimed.

In the accompanying drawings,—Figure 1 is a side elevation of a pair of brake hose and their couplings equipped with the automatic cut-off valves contemplated by the present invention. Fig. 2 is an enlarged detail sectional view of a portion of a brake hose and one of its terminal coupling members fitted with the valve attachment contemplated by the present invention. Fig. 3 is a detail sectional view of the valve attachment showing the valve closed. Fig. 4 is a detail end view of the valve sleeve, and sleeve extension forming a part of the valve attachment. Fig. 5 is a plan view and projected edge view of the form of valve plate preferably employed.

Like references designate corresponding parts in the several figures.

By way of illustrating the application of the invention, there is shown in the drawings, particularly in Fig. 1, the ordinary brake hose 1, 1, of an air-brake system, each of which hose is fitted with the terminal coupling members 2 and 3, the coupling member 2 being the ordinary brake hose coupling member, and the coupling member 3 being the usual union or metallic coupling member between one end of the hose and the train pipe 4, there being usually the ordinary angle cock 5 interposed between the said coupling 3 and the train pipe 4.

According to the present invention, each terminal coupling of each hose 1 is fitted with the automatic valve attachment which comprises a valve sleeve or bushing 6 riveted or otherwise rigidly fastened, as at 7, in the metallic coupling member, a sleeve extension 8 projecting beyond one end of the sleeve 6, and a valve plate 9. The sleeve extension 8 is carried by a separate cross-sectionally curved plate held between the sleeve 6 and the wall of the terminal coupling member and one end of which plate projects beyond that end of the sleeve 6 which is formed in its edges with the concaved valve seat 10 for the convexed side wings 11 of the valve plate 9. This valve plate 9 is intended to entirely cover that end of the sleeve 6 having said seats, and is hinged at one edge, as at 12, to the upper edge of the sleeve 6 at one end of the latter. The said valve plate 9 is provided therein with a relief port 13 and carries near its free edge, opposite the hinge 12, an engaging eye 14, which receives the looped end 15 of an operating wire 16, said looped end of the operating wire being also adapted to slidingly engage in a keeper loop 17 carried by the sleeve extension 8, that is, when the valve is in the open position shown in Fig. 2 of the drawing. The operating wire 16 has similar engagement with the oppositely located valves respectively arranged in the opposite couplings 2 and 3 of each brake hose, and said oppositely located valves are reversely mounted with relation to each other, so that no matter where the break occurs in the hose the closing movement of the valve is in the direction of the line of escape for the air, so as to cut off the latter.

From the foregoing description it will be apparent that in the event of a hose breaking by the pulling apart of the couplers, the consequent pull on the wire 16 will close the cut-off valve 9 and prevent the waste of pressure, the relief port 13 permitting sufficient release of the air pressure for the air brake system carried by the cars in rear of the point or rupture as to give the brakes on said rear cars a service application.

The wire 16 is made of such length that the hose can stretch and not cause the valve to close, but should the hose break or burst the looped end of the wire will draw out of the keeper loop 17 and engage the eye 14 with the result of sharply pulling the valve 9 to its closed position.

I claim—

1. In an air brake system, the combination with the air brake hose, of automatically closing cut-off valves located at opposite end portions of the hose, and an operating wire connecting the valves and holding the latter in a normally inoperative position.

2. In an air brake system, the combination with the air brake hose, of automatically closing and reversely arranged cut-off valves, located at the opposite end portions of the hose, and an operating wire connecting the valves and holding the same in a normally inoperative position.

3. In an air-brake system, the combination with the brake hose and its terminal couplings, of a valve mounting for each coupling consisting of a valve sleeve having a valve seat, a sleeve extension carrying a keeper, and a valve hinged to the valve sleeve and registering with said seat, said valve having an eye and a relief port, and an operating wire having looped ends which respectively engage the said eyes and keepers of the opposite valve mountings.

In testimony whereof I hereunto affix my signature in the presence of two witnesses.

CHARLES F. STRAWMEYER.

Witnesses:
N. E. GEE,
CHARLES ROSS.

---

Copies of this patent may be obtained for five cents each, by addressing the "Commissioner of Patents, Washington, D. C."